(12) United States Patent
Barbano et al.

(10) Patent No.: US 12,203,557 B2
(45) Date of Patent: Jan. 21, 2025

(54) VALVE COMPRISING A COMPENSATION ELEMENT

(71) Applicant: ELTEK S.p.A., Casale Monferrato (IT)

(72) Inventors: Alberto Barbano, Casale Monferrato (IT); Andrea Daffonchio, Casale Monferrato (IT)

(73) Assignee: ELTEK S.p.A., Casale Monferrato (IT)

( * ) Notice: Subject to any disclaimer, the term of this patent is extended or adjusted under 35 U.S.C. 154(b) by 258 days.

(21) Appl. No.: 17/910,781

(22) PCT Filed: Mar. 11, 2021

(86) PCT No.: PCT/IB2021/052047
§ 371 (c)(1),
(2) Date: Sep. 9, 2022

(87) PCT Pub. No.: WO2021/181333
PCT Pub. Date: Sep. 16, 2021

(65) Prior Publication Data
US 2023/0111053 A1    Apr. 13, 2023

(30) Foreign Application Priority Data

Mar. 12, 2020 (IT) .................. 102020000005308

(51) Int. Cl.
*F16K 27/02* (2006.01)
*F16K 31/06* (2006.01)

(52) U.S. Cl.
CPC ........ *F16K 27/029* (2013.01); *F16K 31/0655* (2013.01)

(58) Field of Classification Search
CPC ............. Y10T 137/1189; F16K 27/029; F16K 31/0655; E03B 7/10
See application file for complete search history.

(56) References Cited

U.S. PATENT DOCUMENTS 7,891,370 B1   2/2011  Stange
8,267,375 B1 * 9/2012  LaHousse ........... F15B 13/0405
                                              403/381

(Continued)

FOREIGN PATENT DOCUMENTS

EP    2 693 091    2/2014
EP    3 431 845    1/2019

OTHER PUBLICATIONS

International Search Report and Written Opinion of the ISA for PCT/IB2021/052047 dated Jun. 2, 2021 (11 pages).

*Primary Examiner* — Kevin F Murphy
(74) *Attorney, Agent, or Firm* — Nixon & Vanderhye P.C.

(57) ABSTRACT

A valve (1) for controlling a flow of a fluid comprises: —a valve body having at least one first body part (2) made of a moulded plastic material; —a chamber for passage of the fluid (6), defined within the first body part (2) and comprising at least one fluid inlet (6a) and at least one fluid outlet (6b); —a valve seat (7) defined within the chamber for passage (6) of the fluid; —means for shutting off the fluid (8-9), which can be displaced relative to the valve seat (7) in order to control flow of the fluid; and —a compensation element prearranged for compensating a possible increase in volume and/or pressure of the fluid. The compensation element comprises a compensation body (26) made of an elastically deformable and/or compressible material, the moulded plastic material of the first body part (2) being stiffer than the elastically deformable and/or compressible material. The first body part (2) defines a tubular portion (23) that extends between the valve seat (7) and one of the inlet (6a) and the outlet (6b), within the chamber for passage of the fluid (6). The compensation body (26) is mounted within the chamber for passage of the fluid (6) so as to surround the tubular portion (23) at least partially.

20 Claims, 12 Drawing Sheets

(56) References Cited

U.S. PATENT DOCUMENTS 9,249,909 B2 *  2/2016  Ikushima ................ F16K 27/02
9,631,736 B2 *  4/2017  Kus ..................... F16K 31/0651

* cited by examiner

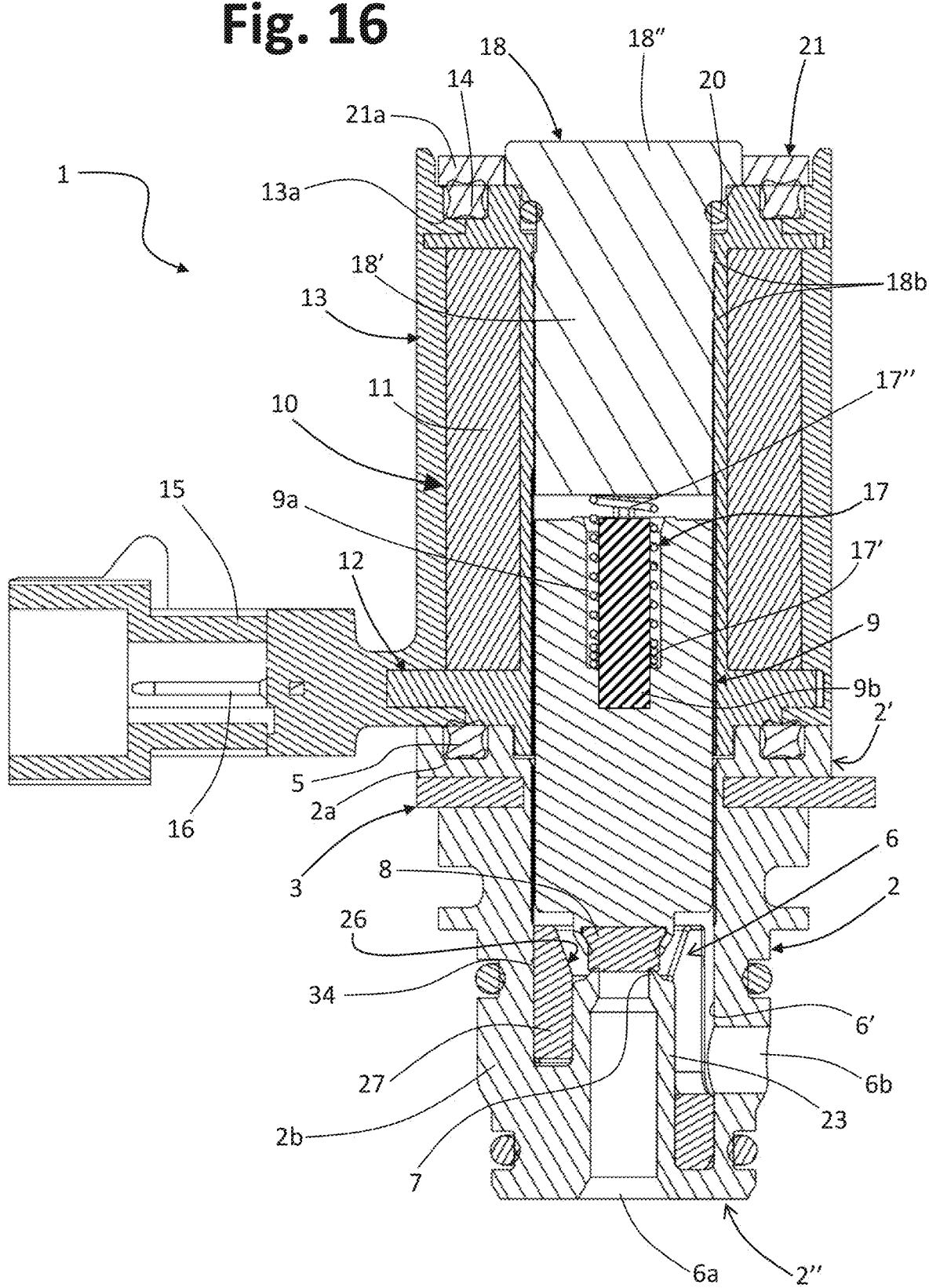

VALVE COMPRISING A COMPENSATION ELEMENT

CROSS-REFERENCE TO RELATED APPLICATION(S)

This application is the U.S. national phase of International Application No. PCT/IB2021/052047 filed Mar. 11, 2021, which designated the U.S. and claims priority to IT 102020000005308 filed Mar. 12, 2020, the entire contents of each of which are hereby incorporated by reference.

FIELD OF THE INVENTION

The present invention relates to a valve for controlling the flow of a fluid, and has been developed with particular reference to an electrically operated valve, which is to be mounted in a fluidic circuit or a fluidic system or a fluidic device, in particular of a motor vehicle or of an electrical household appliance.

PRIOR ART

Valves for controlling the flow of a fluid have been known and marketed for some time now, for use in a wide range of sectors. It is likewise known to provide a compensation element within a valve of the type referred to in order to compensate possible increases in volume and/or pressure of the fluid being controlled and thus prevent onset of structural damage that might jeopardise operation of the valve itself. Solutions of this type are typically adopted in hydraulic devices and fluidic systems that—for more or less prolonged periods—find themselves operating in conditions of low ambient temperature, as for example in the case of motor vehicles or in the case of electrical household appliances installed out of doors (for example, on the balcony of a dwelling) or of in the case irrigation systems.

For instance, the U.S. Pat. No. 7,891,370 B1 describes a pilot valve for irrigators having a body made of plastic material, provided with a housing for installation of a solenoid having a core provided with an open/close member made of elastomer, which is able to co-operate with a valve seat. The valve is provided with a tubular compensation element made of elastomeric material, and hence elastically deformable or compressible, to prevent possible structural damage deriving from freezing of the controlled liquid. Such a compensation element is mounted in a purposely provided housing defined in the valve body, which is separate from the chamber where the valve seat is located, but in any case is in fluid communication with the aforesaid chamber. In this way, a possible increase in volume of the fluid (typically water) due to freezing thereof may be compensated within the valve body thanks to an elastic compression of the compensation element.

The solution described in the document referred to, albeit effective, is relatively complicated and cumbersome, as well as being costly and far from practical in use. There is consequently felt the need for valves for controlling the flow of a fluid that is free from such disadvantages.

OBJECT AND SUMMARY OF THE INVENTION

In view of what has been set forth above, the present invention is aimed at providing a valve for controlling the flow of a fluid having structural characteristics such as to enable a facilitated and more efficient use thereof, even as compared to the known solution described above.

In this general framework, according to an aspect thereof, an aim of the invention is to provide such a valve, comprising a compensation element suitable for preventing possible damage deriving from an increase in volume and/or pressure of the fluid, that has a simple, less expensive, and compact structure. According to another aspect, an aim of the invention is to provide such a valve in which risks of malfunctioning due to inefficient co-operation between the means for shutting off the fluid and a corresponding valve seat are prevented. According to yet another aspect, an aim of the invention is to provide such a valve that is simple and inexpensive to produce.

One or more of the aforesaid aims, and other aims still that will emerge clearly hereinafter, are achieved according to the present invention by a valve for controlling the flow of a fluid and by a corresponding compensation element having the characteristics referred to in the annexed claims. The claims form an integral part of the technical teaching provided herein in relation to the invention.

BRIEF DESCRIPTION OF THE DRAWINGS

Further aims, characteristic, and advantages of the invention will emerge clearly from the ensuing detailed description, with reference to the annexed drawings, which are provided purely by way of non-limiting example and in which:

FIG. 16 is a schematic cross-sectional view similar to that of FIG. 3, regarding a possible variant embodiment.

DESCRIPTION OF EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", "in various embodiments", and the like, which may be present in various points of this description do not necessarily refer to one and the same embodiment. Moreover, particular conformations, structures, or characteristics defined in the framework of the present description may be combined in any adequate way in one or more embodiments, even different from the ones represented. The reference numbers and spatial references (such as "upper", "lower", "top", "bottom" "up", "down", etc.) used herein are provided merely for convenience and hence do not define the sphere of protection or the scope of the embodiments. In the present description and in the attached claims, the generic term "material" is to be understood as comprising mixtures, compositions, or combinations of a number of different materials (for example, multilayer structures or composite materials). In the figures the same reference numbers are used to designate elements that are similar or technically equivalent to one another.

It has to be noted that, in the attached figures, some elastically deformable elements, such as gaskets and an open/close member, are illustrated in some figures (such as FIGS. 3-6, 11 and 16) in an undeformed condition, for needs of representation.

Figure 1:
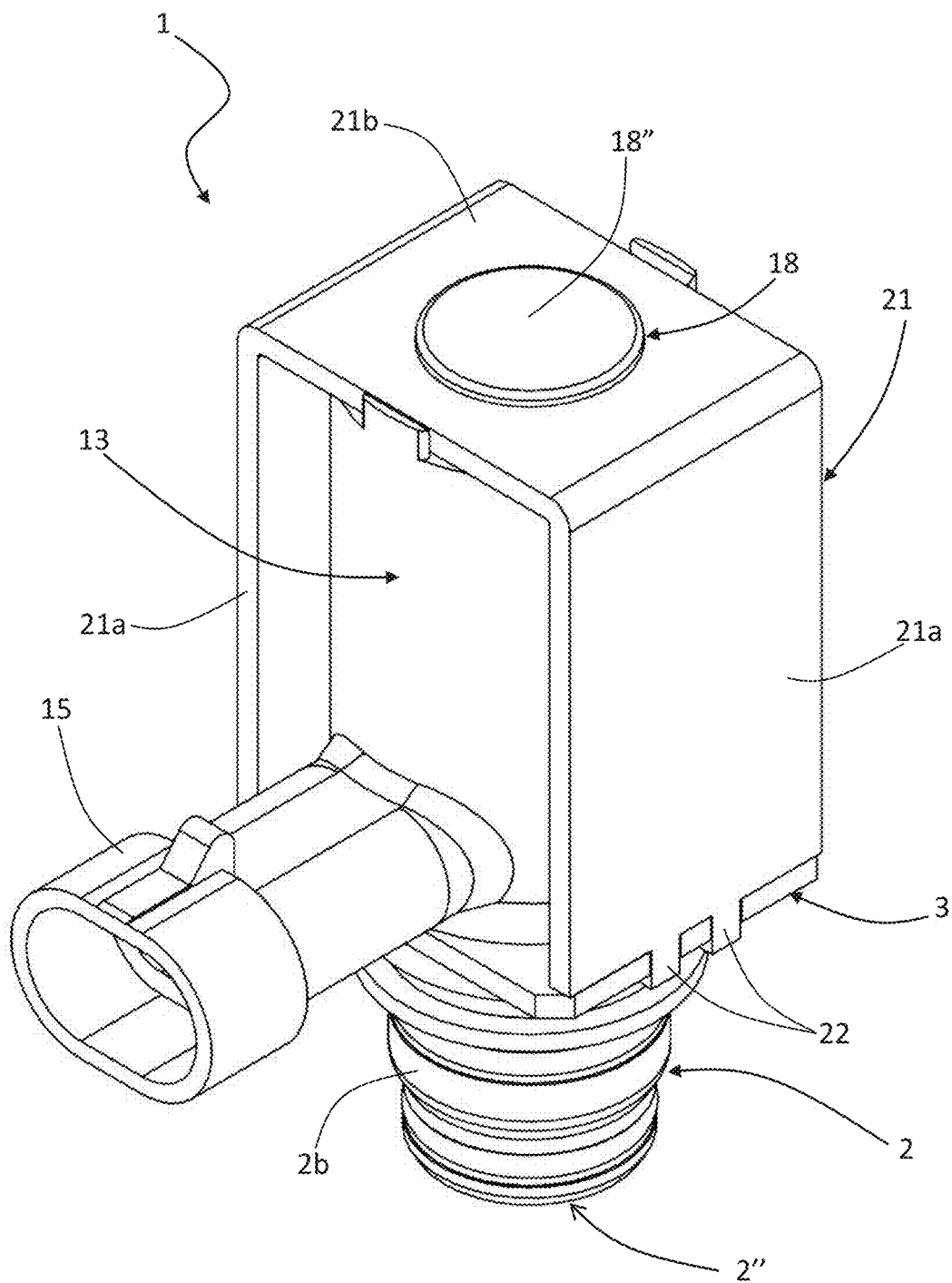
FIG. 1 is a schematic perspective view of a valve according to possible embodiments of the invention.

With initial reference to FIG. 1, designated as a whole by 1 is a valve for controlling the flow of a fluid according to possible embodiments of the present invention. In various embodiments, the valve 1 is an electrically operated valve, in particular a solenoid valve.

The valve 1 comprises a valve body 2, at least part of which is made of moulded plastic material, such as a thermoplastic material, for example polyamide, or polypropylene, or polyphenylene sulphide, or polyphthalamide. The plastic material may be possibly filled, for example added with a reinforcement material, such as a glass fibre.

In the embodiment represented in the figures, the valve body 2 is entirely made of moulded plastic material, but this characteristic is not to be understood in a limiting sense in so far as in other embodiments the valve body 2 may comprise, in addition to the part made of moulded plastic material, one or more portions made of one or more different materials, for example metal.

Figure 2:
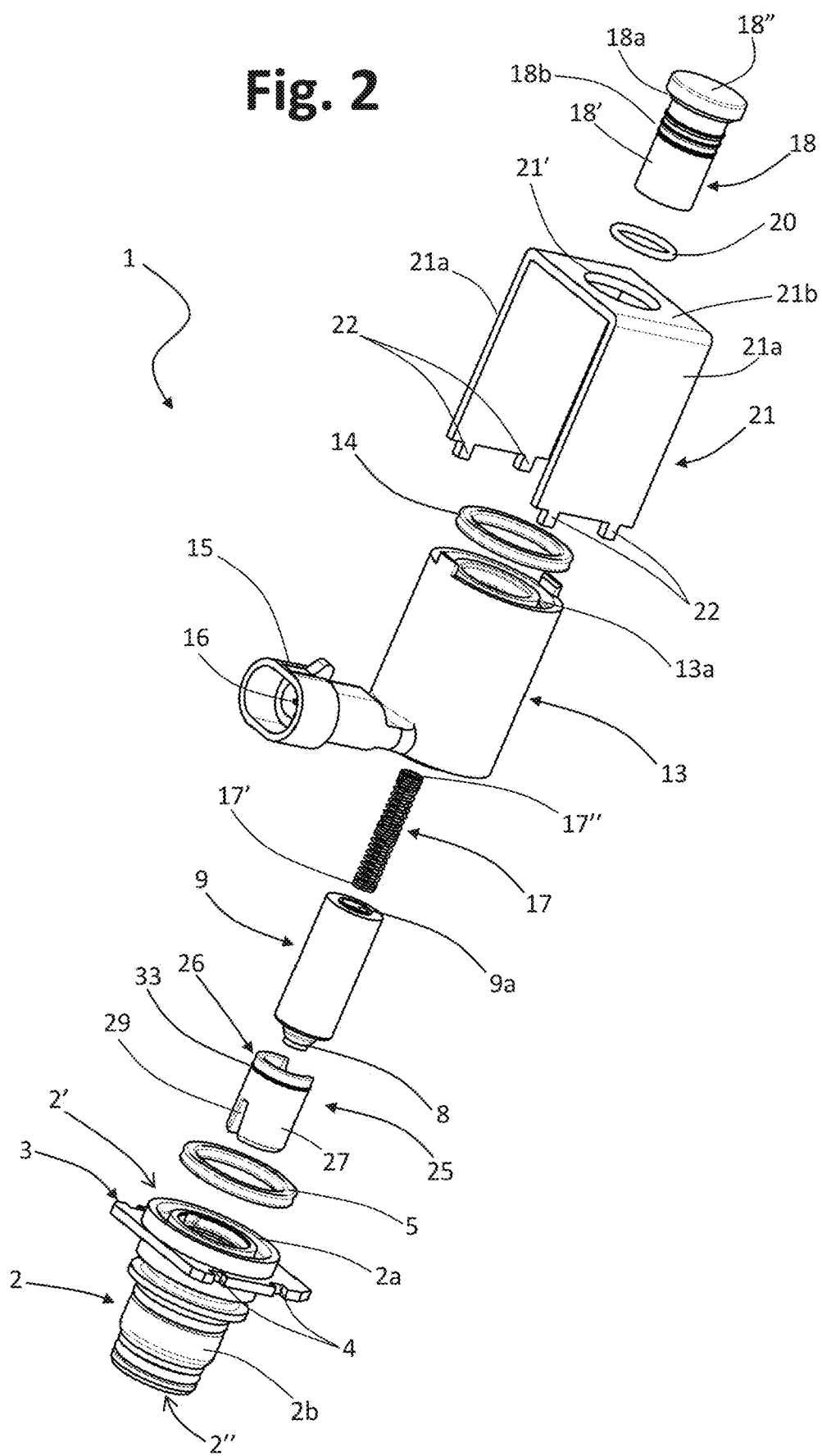
FIG. 2 is a schematic exploded view of a valve according to possible embodiments of the invention.
Figure 3:
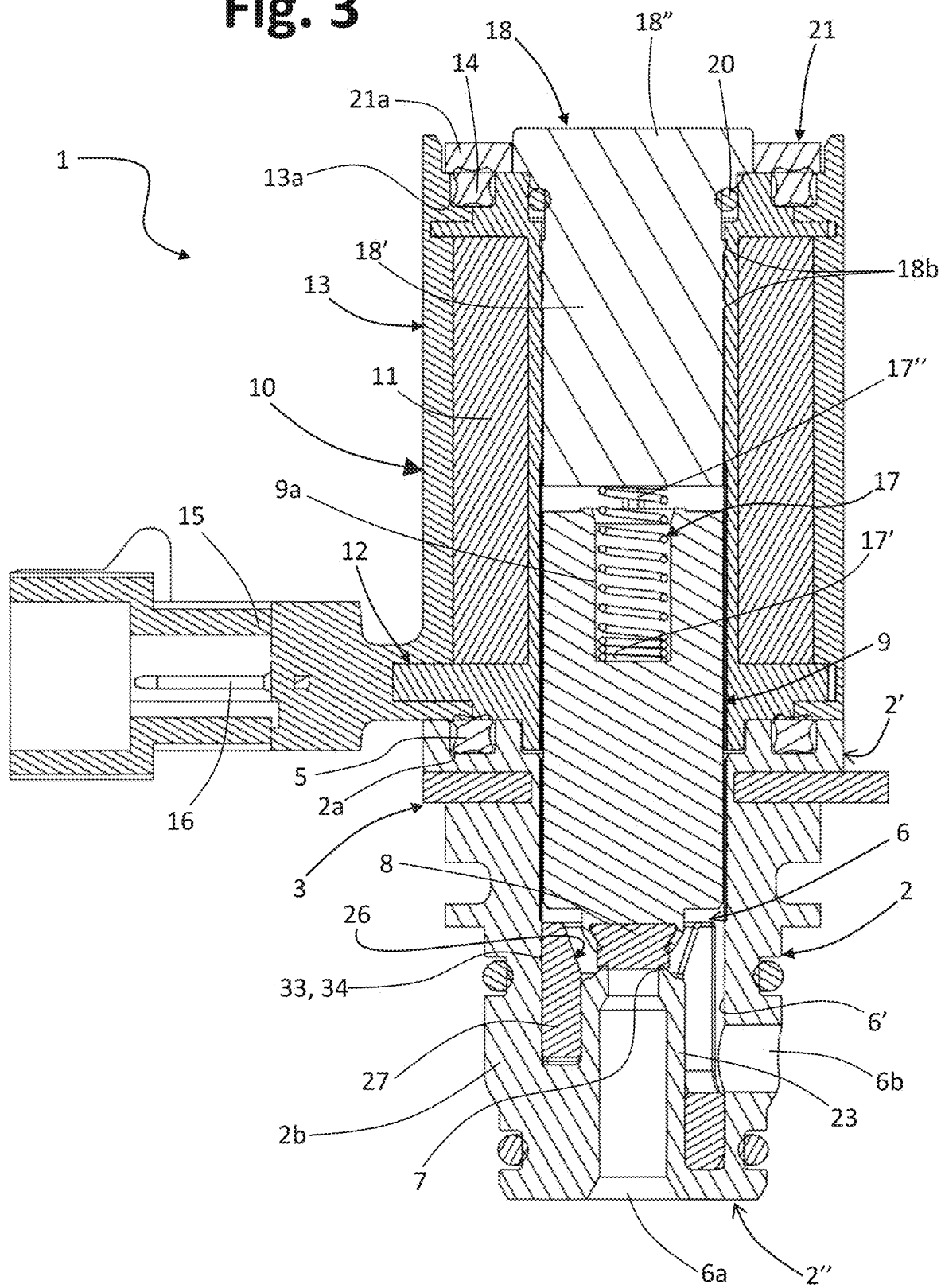
FIGS. 3 and 4 are schematic cross-sectional views of a valve according to possible embodiments of the invention, where corresponding means for shutting off the fluid are in a closing position and in an opening position, respectively.
Figure 4:
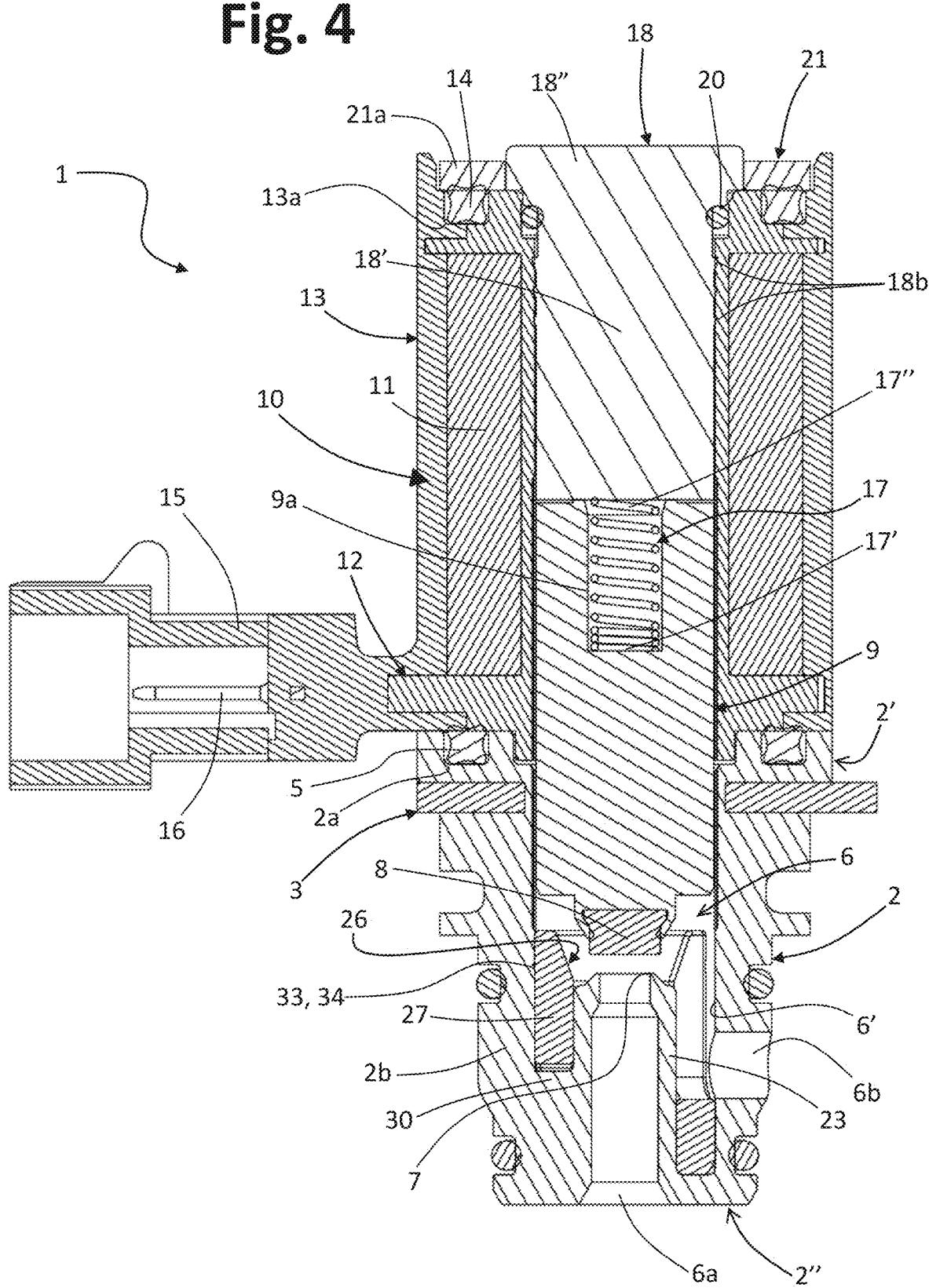

With reference also to FIGS. 2-4, in various embodiments the plastic material of the valve body 2 is overmoulded on a metal insert, here having the shape of a plate 3. In other embodiments, the insert or plate 3 may be mounted or engaged on the body 2. Preferably, the metal plate 3 has a substantially square section, but this characteristic is not limiting in so far as in other embodiments (not illustrated) the plate 3 may have a different section, for example a rectangular or circular section.

In various embodiments, such as the one represented in FIGS. 2-4, the plate 3 is partially englobed or embedded in the plastic material at a first end region 2' of the valve body 2. At least one part of the insert or plate 3 not embedded in the plastic material of the valve body 2, i.e., projecting from the latter, may be configured as polarization element, for the purposes of installation in position of the valve on a different device. The insert or plate 3 may, if need be, serve other purposes, for example to provide a fixing element, such as a flange with holes for screws, or with reliefs belonging to a bayonet coupling.

As will be seen, in various embodiments, the plate 3 is part of an electromagnetic yoke of an actuation coil of the valve 1.

Provision of an insert, such as the plate 3, is also particularly advantageous for the purposes of fixing of an electrical-actuation assembly, described hereinafter, to the valve body 2. For this purpose, preferably the plate 3 has one or more grooves 4 on one or more of its peripheral surfaces that give out on the outside of the material that forms the valve body 2, the function of which will emerge clearly hereinafter. In the embodiment illustrated, the plate 3 has at least one groove 4 on each of its two opposite sides, but this characteristic is not to be understood in a limiting sense.

With reference in particular to FIG. 2, the valve body 2 defines a seat 2a (see also FIGS. 9-10) for receiving a corresponding annular seal element 5, such as a gasket of an X-ring type, as exemplified, or else a gasket with plane surfaces (for example, with a square or rectangular section). In the example illustrated, the seat 2a is located at the first end region 2' of the valve body 2, in its part that projects axially beyond the plate 3, i.e., at a proximal end of the valve body 2. Preferably, the annular element 5 and the seat 2a have a substantially circular shape. However, it is to be understood that, in other embodiments (not illustrated), the seat 2a and the annular element 5 may be absent or else may have shapes and dimensions different from what is illustrated in FIG. 2.

As may be seen, in particular, in FIGS. 3-4, the valve body 2 comprises a chamber for passage of the fluid, designated by 6, defined within the part made of moulded plastic material, which is delimited by an approximately cylindrical peripheral wall 2b. The peripheral wall 2b has an inner surface 6' that peripherally delimits the chamber 6.

The chamber 6 comprises at least one fluid inlet and at least one fluid outlet. In the embodiment illustrated in the figures, the chamber 6 comprises just one inlet 6a and just one outlet 6b, the mutual arrangement of which will be treated in greater detail in the sequel of the present description. However, in other embodiments (not illustrated), the chamber 6 could comprise two or more fluid inlets and/or two or more fluid outlets. In various embodiments, the inlet 6a is defined at an axial end of the valve body 2, in a position opposite to a through opening circumscribed by the seat 2a for the gasket 5, whereas the outlet 6b is defined in the peripheral wall 2b.

Defined within the chamber 6 for passage of the fluid is a valve seat, designated by 7 for example in FIG. 3, with which shutoff means are able to co-operate for shutting off the fluid 8-9, which are displaceable relative to the valve seat 7 in order to control the flow of the fluid. In the preferred embodiment, the shutoff means 8-9 are displaceable relative to the valve seat 7 between at least a closing position (visible in FIG. 3), where the fluid cannot pass from the inlet 6a to the outlet 6b, and an opening position, in particular a position of maximum opening (visible in FIG. 4), where the fluid can pass from the inlet 6a to the outlet 6b, in particular with a maximum flow or flowrate.

In preferred embodiments, the valve 1 is a valve of an open/closed type (normally closed, or else normally open), i.e., of the type where the shutoff means 8-9 are able to assume only the two aforesaid opening and closing positions. In other embodiments (not illustrated), however, the shutoff means 8-9 and the corresponding actuation assembly are configured in such a way that the former can be displaced relative to the valve seat 7 between one or more intermediate positions with respect to the opening and closing positions illustrated in FIGS. 3 and 4 so as to enable variable control of the rate of the flow of fluid between the inlet 6a and the outlet 6b of the chamber 6.

In the preferred embodiment, the shutoff means 8-9 of the fluid comprise an open/close member 8 (or valve member), preferably made at least in part of an elastically deformable material, such as an elastomeric material. In the example represented, the open/close member 8 is basically configured as a rubber element or tip, in particular substantially cylindrical, which is rendered fixed at one axial end of a corresponding drive shaft, here constituted by the movable core 9 of a solenoid, as explained hereinafter. It is to be understood that the open/close member 8 may have shapes and dimensions that vary from one embodiment to another, and also have a hardness that varies according to the application (for example a hardness comprised between 50 and 80 ShA). Possibly the open/close member 8 could be made of metal and/or have a shape designed to facilitate the aforesaid variable regulation of the flow or flowrate.

Figure 5:
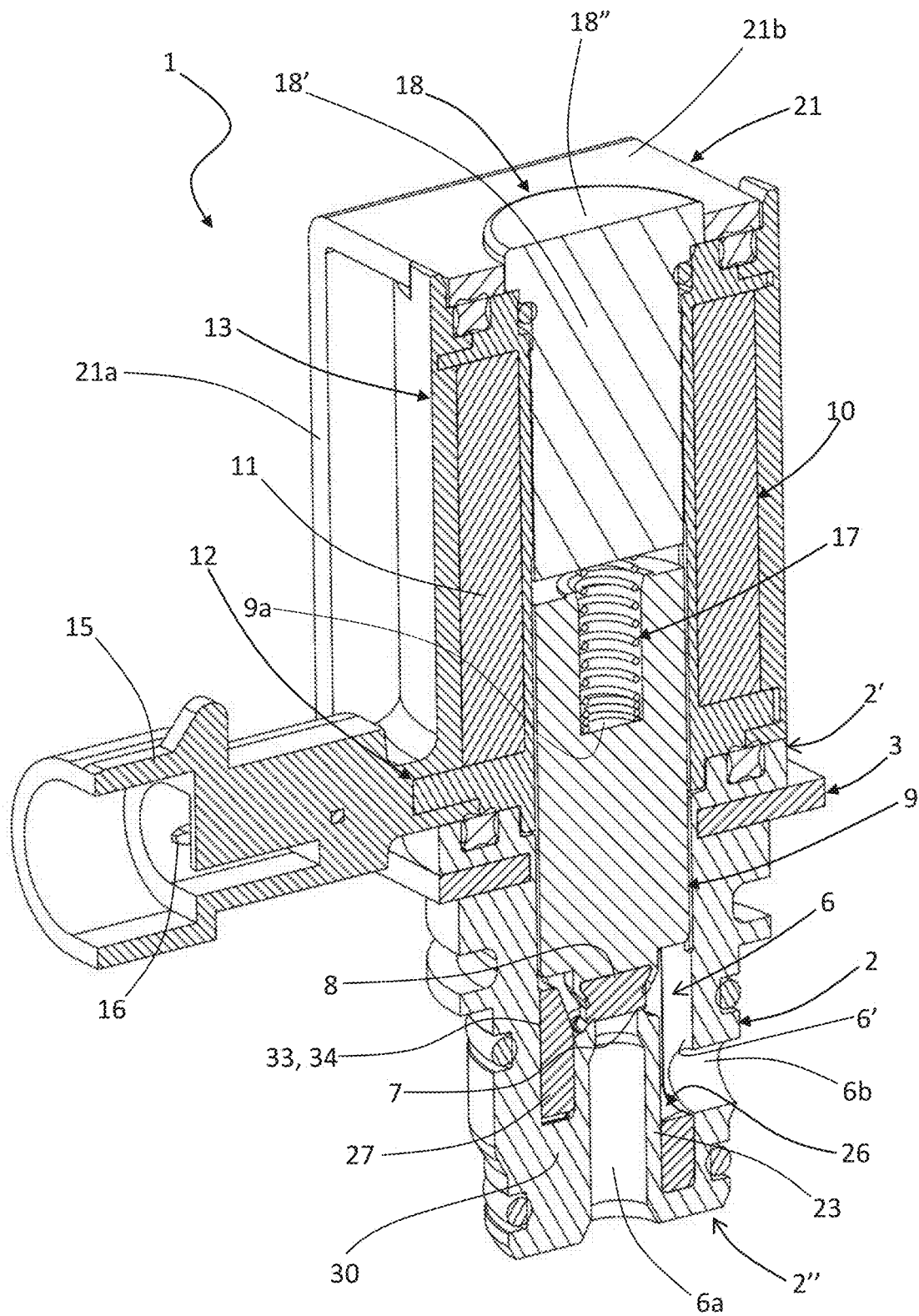
FIGS. 5 and 6 are sectioned schematic perspective views of a valve according to possible embodiments of the invention, where the means for shutting off the fluid are in a closing position.
Figure 6:
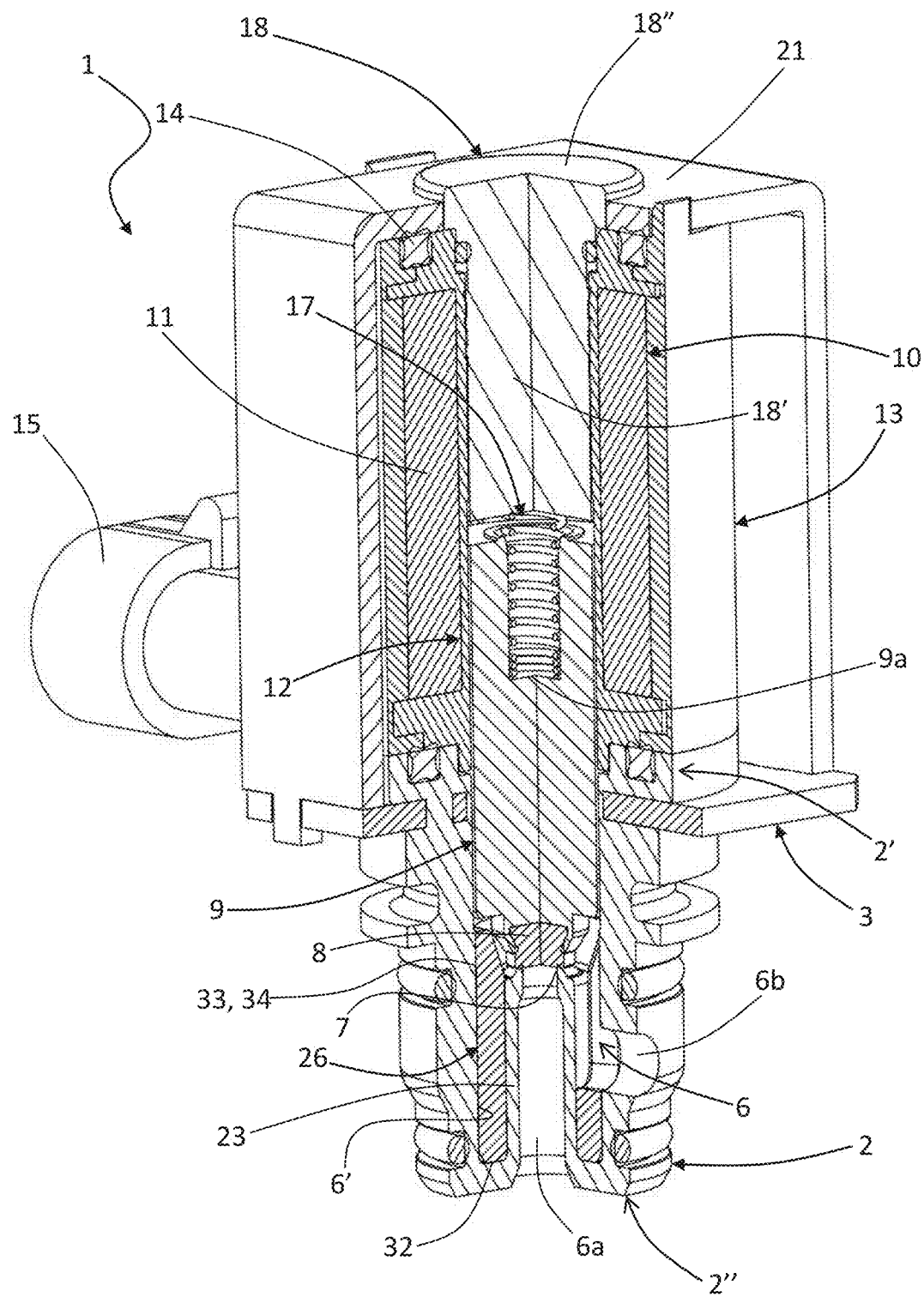

With reference in particular to FIGS. 4-6, when the open/close member 8 rests on the valve seat 7, in the closing position of the valve 1 (FIG. 3), circulation of the fluid between the inlet 6a and the outlet 6b of the chamber 6 is prevented. In embodiments of this type, the dimensions of the cross section of the open/close member 8 are preferably greater than the dimensions of the cross section of the valve seat 7.

However, in other embodiments (not illustrated), the open/close member 8 may be configured so as to penetrate at least partially into a central passage of the valve seat 7, for example when the aforesaid open/close member is brought into the corresponding closing position and/or into intermediate adjustment positions. In these embodiments, the dimensions of the cross section of the open/close member 8 can hence be at least in part smaller than the dimensions of the cross section of the valve seat 7, and the depth of penetration into the valve seat may be variable in different embodiments.

To return to FIG. 2, and as already mentioned, in various embodiments the open/close member 8 is associated to the end of a drive shaft or core 9, preferably having a substantially circular cross section. The core 9 is able to be displaced away from or displaced close to the valve seat 7 via a suitable actuation assembly. In various embodiments, the actuation assembly of the valve 1 comprises an electric actuator. In the preferred embodiment, such as the one illustrated in the figures, the electric actuator is a solenoid, designated as a whole by 10 in FIGS. 3 and 4, comprising a winding 11 that includes an electrical wire wound on a bobbin 12. The bobbin 12 is traversed axially by a cavity (not represented) slidably engaged in at least one portion of which is the core 9. The core 9 is made at least in part of a material that can be attracted by a magnetic field, i.e., a ferromagnetic material. The cavity of the bobbin 12 has a diameter slightly greater than that of the core 9 so as to allow sliding of the latter. For this purpose, at least a portion of the chamber 6 within which the head part of the core 9 slides, provided with the open/close member 8, has a circular section, of a diameter substantially corresponding to that of the cavity of the bobbin 12.

The solenoid 10 is preferably protected by a corresponding casing 13, preferably an overmoulded casing made of electrically insulating material, preferably a moulded plastic material, such as polyamide, or polypropylene, or polyphenylene sulphide, or polyphthalamide, possibly of a type containing filler material.

The casing 13 preferably has a prevalently cylindrical outer shape (see FIG. 2), and in various embodiments likewise defines a connector body, such as the one designated by 15, projecting in a radial direction. In other embodiments (not represented), the connector body may extend in the same axial direction as the actuation coil (i.e., as the ensemble constituted by the bobbin 12 and the winding 11).

The casing 13 defines at its top a seat, designated by 13a in FIG. 2, for receiving a corresponding annular element 14, preferably a gasket, such as a gasket of the X-ring type or else a gasket with plane surfaces. Preferably, the seat 13a and the corresponding annular element 14 have a substantially circular shape: however, it is to be understood that, in other embodiments (not illustrated), the seat 13a and the annular element 14 may be absent or else may have different shapes and dimensions.

In the embodiment illustrated in the figures, the solenoid 10 may be connected to an electric-power mains supply by means of the connector body 15, within which at least two electrical terminals 16 are arranged (just one of which is visible in various figures), one for each end of the electrical wire of the winding 11 wound around the bobbin 12. As per the known technique, passage of electrical current through the winding 11 is able to generate a magnetic field such as to bring about axial displacement of the core 9 within the cavity of the bobbin 12, preferably against the action of an elastic element, such as a spring. In this way, by electrically supplying the solenoid 10, the core 9 can be displaced with respect to a resting position thereof, for example the closing position of the hydraulic duct 6a, 6, 6b, where the open/close member 8 is held in a position corresponding to the valve seat 7, preferably pressed thereon thanks to the action of the aforementioned elastic element. Displacement of the core 9 thus obtained consequently also causes displacement of the open/close member 8 relative to the valve seat 7, thereby enabling flow of the fluid between the inlet 6a and the outlet 6b of the chamber 6.

With reference in particular to FIGS. 2-6, in various embodiments the core 9 defines—at its end opposite to the open/close member 8-a blind cavity 9a, preferably having a cylindrical section. The cavity 9a is prearranged so that the first end 17' of a spring 17 bears upon its bottom, the opposite end 17" of which bears, instead, upon a counter-core, designated as a whole by 18.

The counter-core 18, typically made of ferromagnetic material, has a portion 18' having a substantially circular cross section, which is to be inserted in a fixed way within a corresponding part of the cavity of the bobbin 12. In the example represented, the counter-core 18 moreover has a widened head portion, designated by 18", preferably having perimetral dimensions greater than the through cavity of the bobbin 12. Preferentially, as partially visible in particular in FIG. 2, in the area of transition between the portions 18' and 18" of the counter-core 18 a seat or a shoulder 18a is defined for positioning an annular seal element 20, such as a gasket of the O-ring type. Preferentially, moreover, defined on the peripheral surface of the portion 18' are teeth or reliefs 18b, which are to co-operate mechanically with the surface defining the axial cavity of the bobbin (see, for example, FIGS. 3-4) and basically perform the function of wedge in order to block, via mechanical interference, the portion 18' of the counter-core 18 within the bobbin 12.

In the embodiment illustrated, the portion 18' of the counter-core 18 does not have any cavity at the surface of contact with the second end 17" of the spring 17: however, in other embodiments (not illustrated), the second end 17" of the spring 17 could bear upon the bottom of a blind cavity defined in the aforesaid portion 18', in a position opposite to the head portion 18".

The actuator assembly including the solenoid 10 and the casing 13 is fixed at the region 2' of the valve body 2 so that the head region of the core 9, with the open/close member 8 associated thereto, projects from the assembly itself within the chamber 6, as may be clearly seen in FIGS. 3-4. In this way, the sealing means represented by the gasket 5 operate between the front of the assembly 10-13 and the valve body 2.

As may be seen, in particular, in FIGS. 1-6, in various embodiments, the casing 13, with the solenoid 10 inside it, is mechanically secured to the valve body 2 by means of a metal armature 21, in particular made of ferromagnetic material, here substantially U-shaped, i.e., having two generally parallel upright walls 21a connected together by a transverse part 21b.

At the ends of the walls 21a opposite to the wall 21b there may be provided appendages 22, configured for coupling with the aforementioned grooves 4 of the plate 3 (see FIG. 2). For instance, a stretch of each appendage 22 can be engaged in a respective groove 4, and a terminal stretch of the same appendage 22 can be bent so as to engage the plate 3 and the armature 21 together, thereby completing an electromagnetic yoke of the solenoid 10: in the example, then, the ensemble consisting of the solenoid 10 and the coating 13 results in being packed between the valve body 2 and the armature 21, with the gasket 5 set in between.

In various embodiments, such as the one represented, the armature 21 has a hole 21' in its transverse wall 21b to enable penetration of the portion 18' of the counter-core 18 within the cavity of the bobbin 12, up to the mechanical end-of-travel determined by the head portion 18", with the possible sealing element 20 that bears upon an internal shoulder of the cavity of the bobbin 12. Preferably, in the assembled configuration, the armature 21 and the counter-core 18 are in contact, for example with mutual mechanical interference, i.e., coupled at an electromagnetic level.

According to an important aspect, the valve body 2 made of plastic material is moulded so as to define a longitudinally extended tubular portion, which extends in the chamber for passage of the fluid between the valve seat and one of the fluid inlet and the fluid outlet. Preferentially, this tubular portion extends longitudinally or axially-between the valve seat and the aforesaid at least one of the inlet and the outlet-in the same direction of movement as the open/close means of the valve. Once again preferentially, the other one of the fluid inlet and the fluid outlet is set laterally with respect to the aforesaid tubular portion.

With reference to the example illustrated, and as may be seen, in particular, in FIGS. 3-6 and 9-10, the valve body 2 defines the tubular portion designated by 23, which here extends between the valve seat 7 and the fluid inlet 6a, within the chamber 6, preferably substantially coaxial with respect to the peripheral cylindrical surface 6' of the chamber 6 itself. Preferentially, the tubular portion is substantially cylindrical.

In preferred embodiments of the invention, the average thickness of the tubular portion 23 is less than the average thickness of the wall 2b of the valve body 2 that peripherally delimits the chamber 6 for passage of the fluid (meaning thereby an average between the minimum thickness and the maximum thickness of the wall of the portion 23, on the one hand, and of the wall 2b, on the other).

A moulded plastic material usually undergoes a so-called "shrinkage" after the moulding step. The shrinkage consists substantially in a dimensional reduction of the material that occurs following upon its cooling and hardening. This shrinkage is variable as a consequence of the type of material (the characteristics of which may differ to a certain extent from one manufacturer of the raw material to another) and according to other process parameters, which are also potentially subject to variations for a wide range of factors (for example, the ambient temperature and/or the temperature of the mould, wear, moulding rate, etc.). As a consequence of shrinkage, in the case of a valve of the type considered here, there could then take place dimensional variations of the valve seat with respect to the optimal dimensions of design, which could in turn be at the origin of incorrect co-operation between the open/close member 8 and the valve seat 7, and consequently to an incorrect control of the flow of fluid by the valve.

In order to overcome this drawback, in preferential embodiments of the invention, using the same moulded plastic material as that of the valve body 2, the tubular portion 23 of small thickness is defined, which defines at its end the valve seat 7. As has been said, the average thickness of the tubular wall is less than the average thickness of the wall 2b that peripherally delimits the chamber 6. By way of indication, the average thickness of the wall of the tubular portion 23 may be comprised between 1.6 and 1.8 mm, whereas the average thickness of the peripheral wall 2b may be comprised between 2.5 and 2.8 mm.

In this way, given that the shrinkage of the plastic material after the moulding step is substantially proportional to the thickness of the material itself, the tubular portion 23 will undergo a very contained shrinkage, such as to guarantee in any case definition of a sufficiently precise valve seat 7, i.e., such as not to jeopardise its co-operation with the open/close member 8. Instead, the peripheral wall 2b of the valve body 2, which delimits the chamber 6, may be formed with the thickness deemed most suitable in view of the operating pressure of the fluid being controlled and of the mechanical anchorage of the actuator assembly 10-13. As will moreover be appreciated, the valve seat 7 may also be defined directly by the tubular portion 23 itself; i.e., it is made of a single piece with the valve body 2, without any need to use an additional element dedicated for this purpose, as for example in U.S. Pat. No. 7,891,370 B2.

As has been said, preferentially the one between the fluid inlet and the fluid outlet not defined by the tubular portion 23 is set laterally with respect to the latter. Consequently—with reference to the non-limiting example illustrated in the figures, where the tubular portion 23 extends between the valve seat 7 and the fluid inlet 6a—the fluid outlet 6b is defined in the valve body 2 laterally with respect to the tubular portion 23, in the wall 2b. It should be noted that, in other embodiments, the port designated by 6a in the figures could correspond to the fluid outlet, and the port designated by 6b could correspond to the fluid inlet. In such embodiments, consequently, the tubular portion 23 extends between the valve seat 7 and the fluid outlet, and the fluid inlet is set laterally with respect to the tubular portion 23. In other embodiments, the port 6b could also be set substantially parallel to the port 6a, for this purpose the body portion 2 being appropriately shaped.

As has been said, in the preferential embodiment represented in the figures, the tubular portion 23 has a substantially cylindrical shape, i.e., a circular section. However, this characteristic is not to be understood in a limiting sense in so far as other shapes of the section are possible, in particular also in relation to the type of open/close member 8 used.

According to an aspect of the invention, the valve 1 comprises a compensation element, prearranged for compensating a possible increase in volume and/or pressure of the controlled fluid, which is mounted within the chamber 6.

Figure 7:
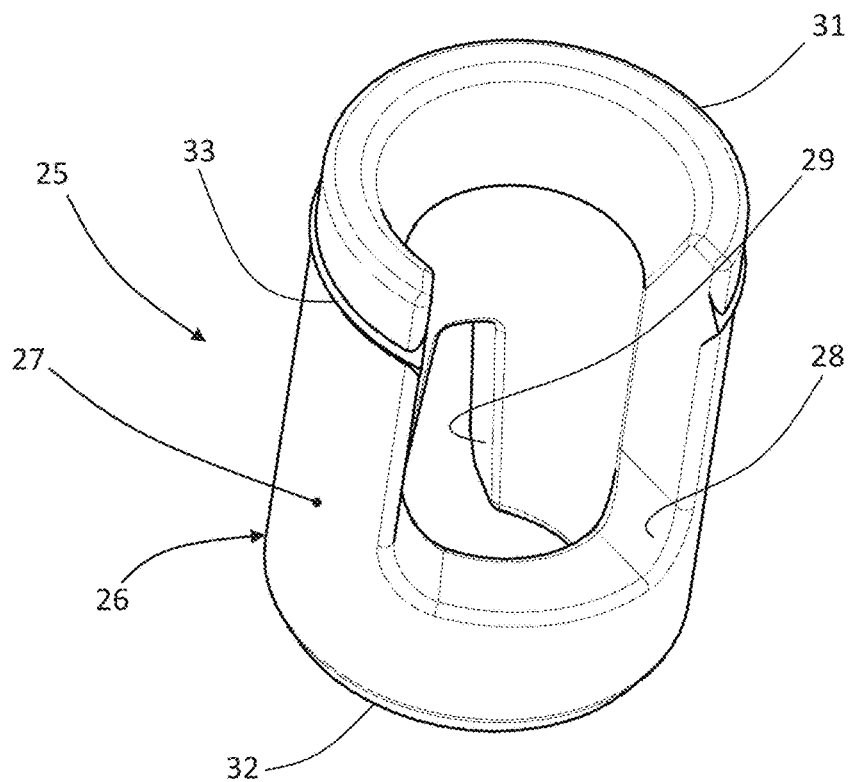
FIGS. 7 and 8 are schematic perspective views of a compensation element according to possible embodiments of the invention.
Figure 8:
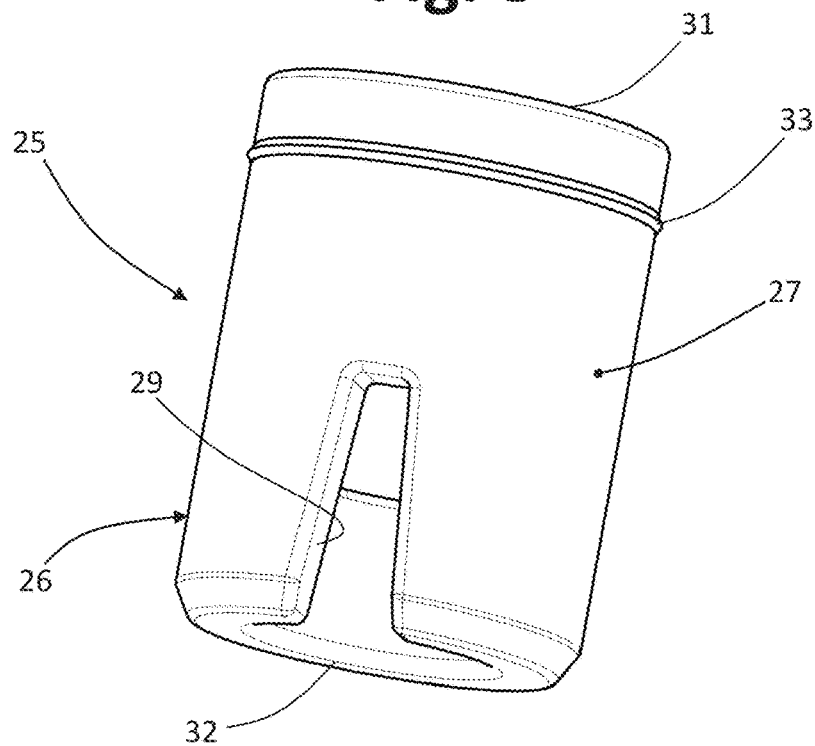

As may be seen, for example, in FIGS. 2 and 7-8, this compensation element, designated as a whole by 25, comprises at least one compensation body 26 made of an elastically deformable and/or compressible material, for example an elastomeric material. For instance, the body 26 can be moulded with a silicone material, such as a silicone elastomer or a liquid-silicone rubber (LSR) or a fluoro-liquid-silicone rubber (FLSR). Preferably, the compensation body 26 is made of a material of an impermeable type so as to prevent any penetration of the fluid thereinto. For this purpose, preferentially the material chosen has a closed-cell structure. The moulded plastic material of the valve body 2 is in any case stiffer than the elastically deformable and/or compressible material of the compensation body 26.

In the embodiment represented in the figures, the compensation element 25 is entirely constituted by a compensation body 26 made of deformable and/or compressible material. However, this characteristic is not to be understood in a limiting sense in so far as in other embodiments (not illustrated) the compensation element 25 may include other parts, which may be made also of different materials; for example, the compensation element could include a core made of a relatively stiff material, fixed (for example overmoulded) on which is a compensation body 26. As may be noted, for example in FIGS. 2-3, the body 26 of the compensation element 25 is configured as a distinct component with respect to the valve body 2, designed to be mounted thereon.

Figure 9:
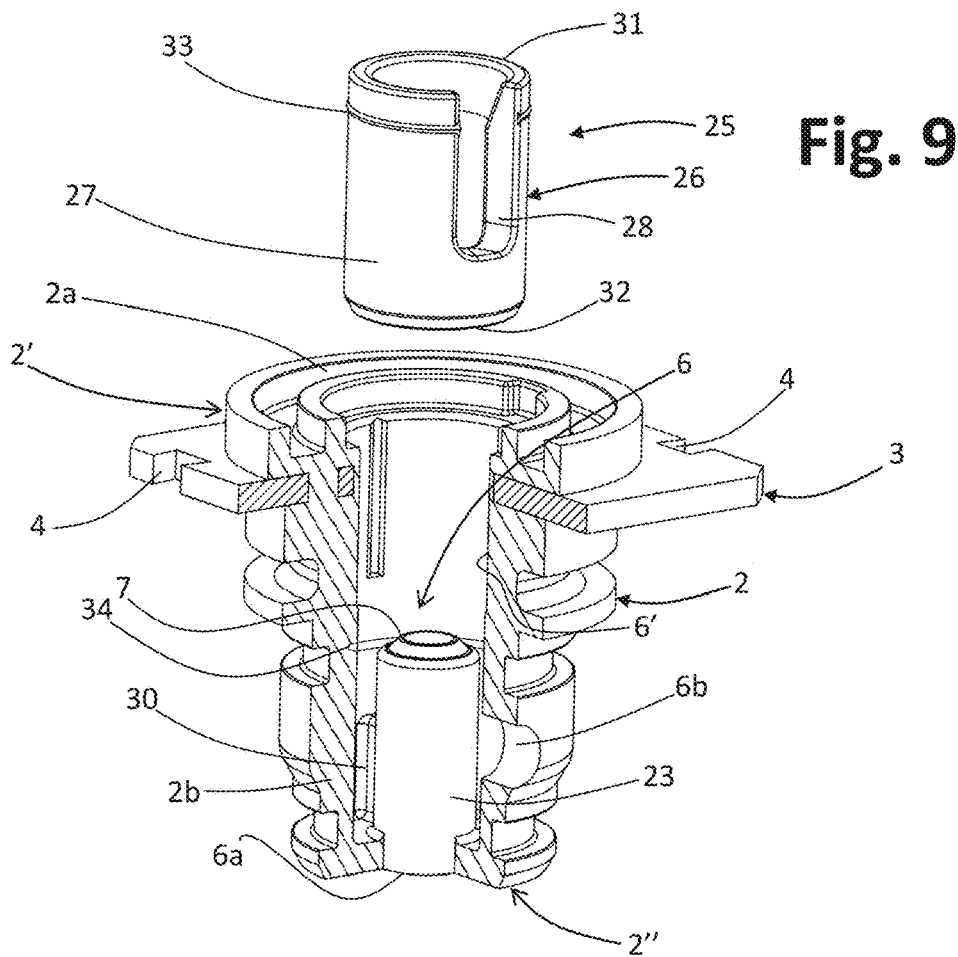
FIGS. 9 and 10 are sectioned schematic perspective views of a part made of moulded plastic material of a body of a valve according to possible embodiments of the invention, with a corresponding compensation element not yet mounted and mounted, respectively.
Figure 10:
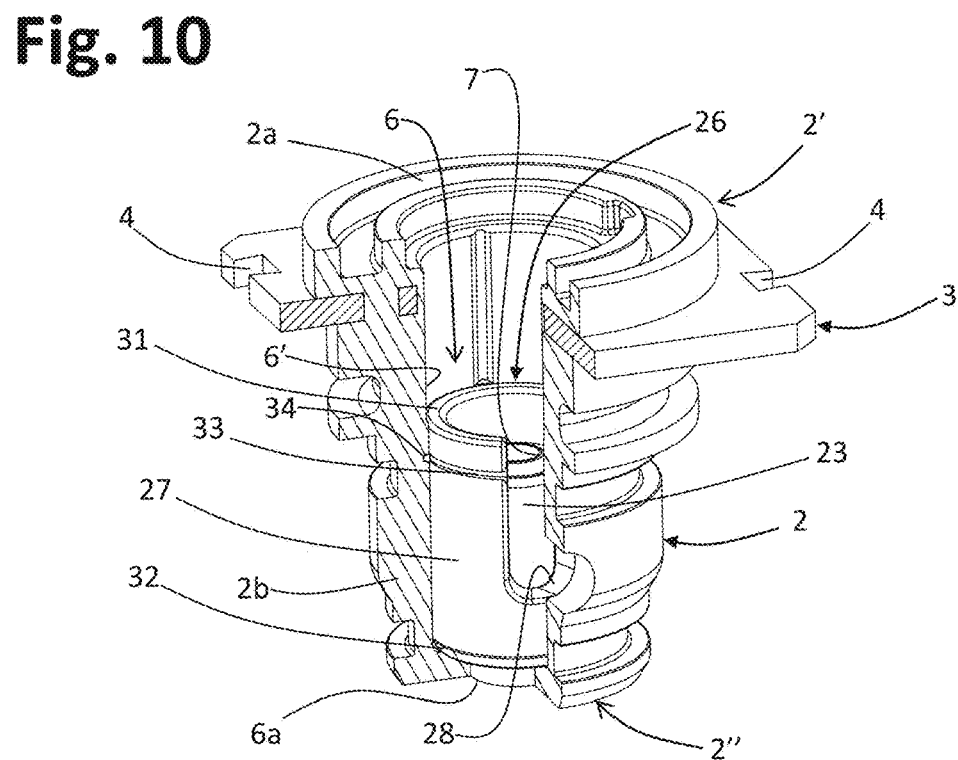

As may be seen, in particular, in FIGS. 9-10, the compensation body 26 is mounted within the chamber 6 so as to surround the tubular portion 23 at least partially. For this purpose, preferentially the compensation body 26 has a section of a suitable shape, in particular with a peripheral wall 27 of a substantially cylindrical shape. However, this characteristic is not limiting in so far as in other embodiments (not illustrated) the compensation body 26 has a section with a shape different from the cylindrical one.

Preferably, the compensation element 25 has at least one peripheral surface having a profile at least in part complementary with that of a peripheral surface of one of the chamber 6 and the tubular portion 23. For instance, the outer surface of the peripheral wall 27 of the compensation body 26 may have a profile that is at least in part complementary to the surface 6' of the body 2 that peripherally delimits the chamber 6. In addition or as an alternative, the inner surface of the peripheral wall 27 may have a profile at least in part complementary to the outer surface of the tubular portion 23.

In possible variant embodiments, on the other hand, the compensation element 25 is coupled, for example elastically, on just the tubular portion 23, leaving space (for example an annular gap) with respect to the surface 6' that delimits the chamber 6 laterally. As an alternative, the compensation element 25 could couple with the peripheral surface 6' of the chamber 6 via reliefs or projections of the outer surface of the wall 27, these reliefs or projections possibly extending in the axial direction of the element 25.

Preferentially, the axial extension of the compensation body 26 is such that, when positioned within the chamber 6, its upper end is located higher up than the valve seat 7, as may be noted, for example, in FIG. 3: in any case, since the body 26 is axially hollow, the open/close member 8 carried by the core 9 can in any case reach the valve seat 7.

With reference, in particular, to FIG. 7, in various embodiments the compensation body 26 comprises at least one lateral passageway 28 at its peripheral wall 27 to allow passage of the fluid between the valve seat 7 and the outlet 6b. Preferably, the lateral passageway 28 comprises a recess that extends from a first longitudinal end 31 of the wall 27.

The shape and extension of the passageway 28 may vary from one embodiment to another. In the embodiment represented in the figures, the compensation body 26 comprises just one lateral passageway 28. However, in other embodiments (not illustrated), two or more lateral passageways 28 may be provided. This solution is rendered necessary, for example, when the chamber 6 for passage of the fluid comprises two or more outlets (or inlets) 6b.

In the embodiment represented in the figures, the lateral passageway 28 comprises a recess that extends from a first longitudinal end 31. However, in other embodiments (not illustrated), the passageway 28 could have some other shape, for example be constituted by a hole in the peripheral wall 27 or some other hole in the compensation body 26.

In various embodiments, the valve body defines within the chamber for passage of the fluid a polarization or positioning element, which is to co-operate with a polarization or positioning counter-element of the compensation element in order to guarantee their correct mutual angular positioning, for example in the assembly stage. Preferentially, the aforesaid polarization element is defined in a lateral position with respect to the tubular portion defining the valve seat.

For instance, with reference in particular to FIGS. 4 and 9, defined within the chamber 6 is a polarization element 30, here substantially constituted by a rib or relief of the peripheral surface 6' of the chamber 6, which extends in a lateral position with respect to the tubular portion 23.

On the other hand, as may be noted in FIG. 8, the peripheral wall 27 of the compensation body defines a polarization counter-element 29, prearranged for receiving the element 30. In the example, the polarization counter-element 29 comprises a recess that extends from the second longitudinal end 32 of the cylindrical wall 27 of the compensation body 26. Also in this case, the shape and extension of the recess may vary from one embodiment to another.

In a preferential version, the polarization counter-element or recess 29 has opposite inclined surfaces, provided for coupling with surfaces of the polarization element or relief 30, which preferably are also at least in part inclined in opposite directions. The inclination of these surfaces also favours autonomous polarization or centring during installation, in particular via slight autonomous rotations of the compensation body 26, until it comes to orient itself in the predefined position.

The presence of the element 30 and of the counter-element 29, in addition to simplifying the operation of assembly of the valve 1, prevents rotation of the compensation body 26 with respect to the valve body 2, so that the lateral passageway 28 is always in the optimal position for allowing passage of the fluid between the valve seat 7 and the outlet (or inlet) 6b.

In the embodiment represented in the figures, the compensation body 26 comprises just one polarization counter-element 29, but it is clear that in other embodiments (not illustrated) the body 26 could comprise two or more counter-elements 29, and provided within the chamber 6 there could be as many polarization elements 30. Obviously, also possible is a reverse arrangement, i.e., with the chamber 6 that includes at least one seat or recess, and the compensation body 26 that comprises as many corresponding reliefs that engage in said recess.

In the embodiment represented in the figures, the lateral passageway 28 and the polarization counter-element 29 are defined in substantially opposite positions of the cylindrical wall 27 of the body 26. Not even this characteristic is, however, to be understood in a limiting sense in so far as in other embodiments (not illustrated) the passageway 28 and the counter-element 29 could be in different angular positions.

In various preferential embodiments, at least one of the chamber for passage of the fluid and the compensation element comprises engagement means, prearranged for keeping the compensation element in a substantially pre-set axial position within the chamber for passage of the fluid.

In various embodiments, the aforesaid engagement means comprise at least one relief or rib on the outer surface of the wall 27 of the body 26. In the embodiment represented in the figures, such a relief or rib, designated by 33 in FIGS. 7-8, extends for at least a part of circumference of the compensation body 26. The rib 33, which may consequently have an annular shape, is configured to couple in an elastic way with the surface 6' of the valve body 2. In addition or as an alternative, the engagement means could be provided on the body 2, for example in the form of one or more reliefs or seats defined in the surface 6', with which the compensation body 26 interferes elastically, in particular on the outer surface of its wall 27.

The aforesaid engagement means may also be mutual-engagement means, i.e., provided for coupling together. For instance, in the non-limiting case exemplified in the figures, in the surface 6' of the chamber 6 there may be defined a seat 34 where the rib 33 can be engaged.

In other embodiments (not illustrated), the compensation body 26 may comprise two or more peripheral ribs 33, and the chamber 6 could comprise as many corresponding seats 34. Obviously, also possible is a reverse arrangement, i.e., with the chamber 6 that includes one or more peripheral ribs, and the compensation body 26 that possibly comprises as many corresponding seats that extend for at least a part of its circumference.

In various embodiments, the valve 1 is comprised in a fluidic circuit or system or device, for example a hydraulic or pneumatic one. As mentioned, such a circuit may belong, for example, to an irrigation system, or such a device may be an electrical household appliance. Preferably, the valve 1 finds application in circuits, devices or systems on board a vehicle, in particular a motor vehicle. For instance, the valve forming the subject of the invention may be advantageously used in circuits, systems and devices for the control and/or supply of water (or aqueous solution) in a vehicle, such as a system for washing the windscreen or headlamps of a motor vehicle, or a system for washing sensors belonging to autonomous-driving systems, such as video cameras and sensors of LIDAR (Light Detection and Ranging) systems, a system for the control and/or supply of a water-urea solution to an SCR (Selective Catalytic Reduction) system for abatement of nitrogen oxides from exhaust gases of an internal-combustion engine, a system for injection of water belonging to an ADI (Anti-Detonant Injection) system.

In what follows, a detailed description will be provided of use of a preferred embodiment of the valve, such as the one represented schematically in FIGS. 1-10. It is to be understood that this description is aimed only at enabling an understanding of the mechanism of operation, and is not intended as in any way limiting the sphere of protection defined by the annexed claims.

In the preferred embodiment represented in the figures, when the valve 1 is in resting conditions (i.e., with the actuator assembly 10-13 not electrically powered), the open/close member 8 carried by the core 9 is in a closing position relative to the valve seat 7, as illustrated in FIGS. 3 and 5-6, urged into this position by the spring 17. In this condition, as has been said, there is no passage of fluid between the inlet 6a and the outlet 6b of the chamber 6. When it is necessary to open the valve 1, the solenoid 10 is electrically supplied. The solenoid 10 hence generates a magnetic field that exerts an attraction on the core 9, causing it to recede with respect to the valve seat 7, and hence bringing about compression of the spring 17, as may be seen in FIG. 4. As mentioned previously, the plate 3, the counter-core 18, and the armature 21 provide a stationary electromagnetic yoke for the actuation coil formed by the winding 11 on the bobbin 12.

When the aforesaid actuation coil is supplied, a force of magnetic attraction is generated on the yoke, which the counter-core 18 tends to concentrate on the core 9 so as to bring about recession of the latter, according to a technique in itself known. Displacement of the core 9 causes a corresponding recession of the open/close member 8 with respect to the valve seat 7, with the fluid that is free to circulate between the inlet 6a and the outlet 6b of the chamber 6. Next, interruption of electrical supply of the solenoid 10 causes the magnetic field to cease, and the elastic reaction of the spring 17 brings back the core 9 into the original position of FIG. 3, with the open/close member 8 that once again closes the valve seat 7.

It is possible that, when the open/close member 8 is located in the closing position, residual fluid will remain inside the chamber 6. This risk occurs also when the hydraulic system in which the valve is inserted is subjected to operations of emptying, during which only the inlet 6a and the inside of the tubular portion 23 could be emptied, whereas in the chamber 6 there would in any case remain fluid. In the event of freezing of this residual fluid, its consequent increase in volume could bring about a considerable thrust in recession on the open/close member 8 and the core 9, and hence on the counter-core 18 and on the actuator assembly 10-13 as a whole. This thrust could have a force such as to jeopardise fixing and/or sealing between the valve body 2 and the actuator assembly 10-13. The presence of the compensation body 26 within the chamber 6 enables limitation of the amount of residual fluid that can remain within the chamber 6; at the same time, the capacity of the body 26 to be compressed enables compensation of the increase in volume of the fluid.

Figure 11:
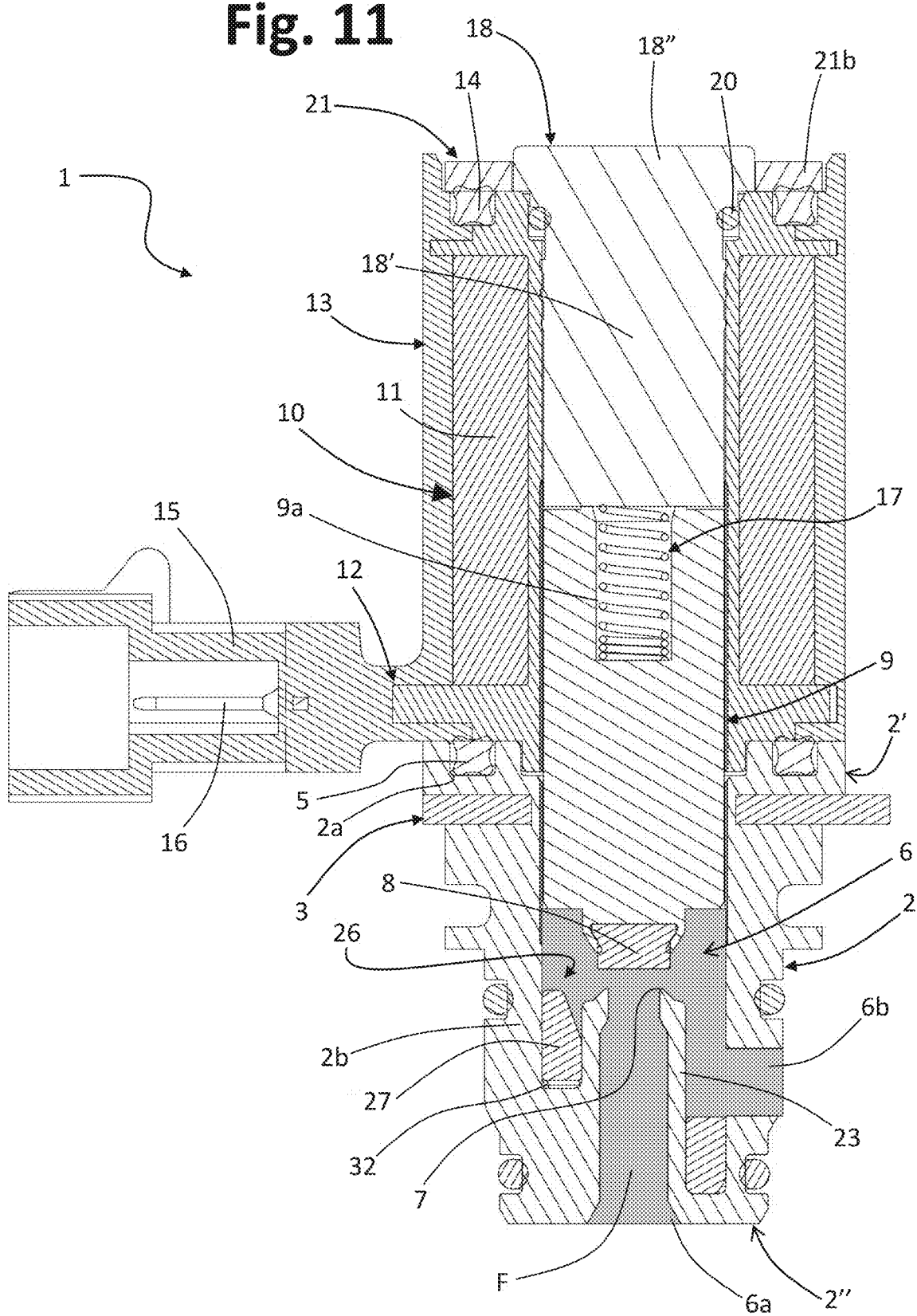
FIG. 11 is a cross-sectional view similar to that of FIG. 4, aimed at exemplifying operation of a compensation element provided according to the invention.

FIG. 11 exemplifies a case where the hydraulic system that includes the valve 1 is not subject to operations of emptying, so that within the chamber 6, and upstream and downstream thereof, fluid F subject to freezing is present. From a comparison between FIGS. 4 and 11 it may be noted how the increase in volume of the fluid F causes a modest recession of the core 9, by an amount comparable to what occurs in normal operating conditions when the solenoid 10 is electrically powered. This is enabled by the prevalently axial compression of the body 26, as highlighted in FIG. 11, which enables significant compensation of the increase in volume of the fluid F.

As has been said, FIG. 11 regards a case where the fluid remains within the hydraulic circuit where the valve 1 is inserted, i.e., upstream and downstream thereof. In applications of this type, the increase in volume of the residual fluid within the tubular portion 23 is substantially compensated by the increase in volume of the residual fluid within the chamber 6 and the outlet 6b, so that no significant deformation of the tubular portion itself intervenes.

In other applications, however, the hydraulic circuit or device where the valve 1 is inserted may be of the type where the circuit branches upstream and downstream of the valve itself are emptied following upon use, as mentioned above. For instance, in some hydraulic systems, such as some SCR systems, purposely provided steps of emptying of the liquid are envisaged, precisely in order to prevent or at least contain risks linked to possible freezing. However, this does not rule out the possibility of residue of such liquid possibly in any case remain inside the chamber 6.

In the case of applications of this type, within the tubular portion 23 no liquid is hence present, which is instead present in the chamber 6. The increase in volume of the residual liquid in the chamber 6 may bring about a significant compression of the tubular portion 23 in a radial direction, and hence equally significant deformations of the portion 23, in particular in view of its small thickness.

Figure 12:
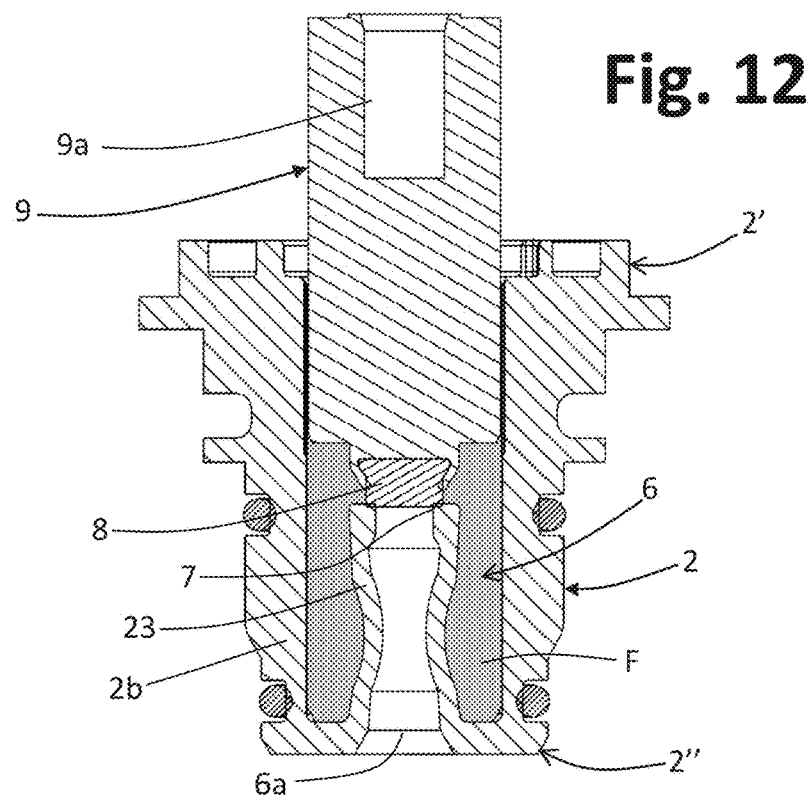
FIGS. 12-14 are schematic cross-sectional views of parts of a valve, aimed at exemplifying possible deformations undergone by a tubular portion of a valve body on account of freezing of the fluid being controlled, in the absence of a compensation element.
Figure 13:
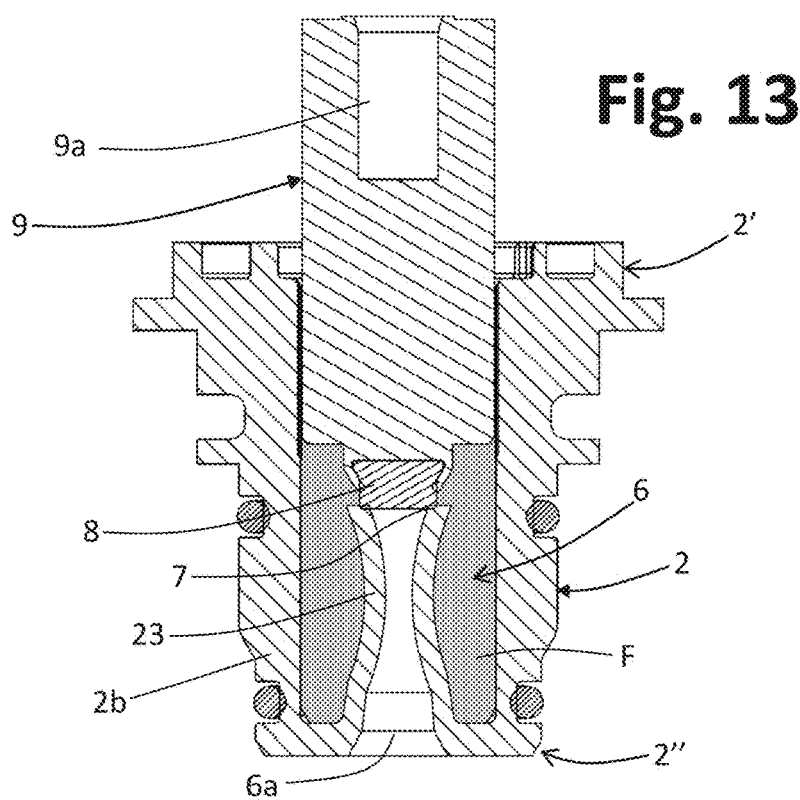
Figure 14:
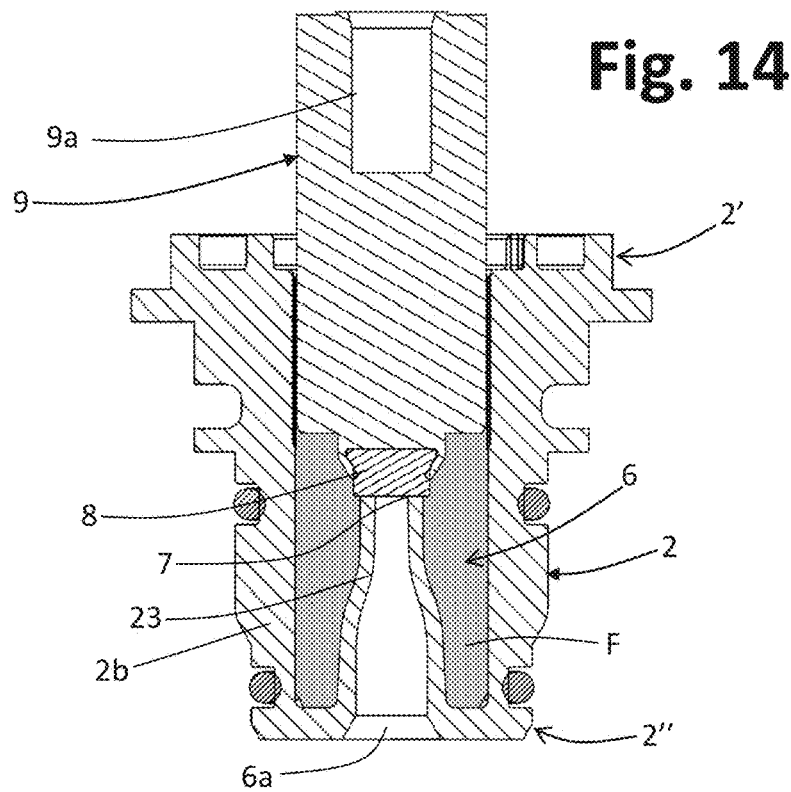

FIGS. 12-14 show situations of this type in the case of valves without a compensation body 26 within the chamber 6. From these figures it may be noted how the increase in volume of the fluid F brings about considerable deformations of the portion 23, which in the limit may bring about permanent failure or deformation thereof such as to jeopardise proper co-operation between the open/close member 8 and the valve seat 7.

FIGS. 12-14 exemplify how the increase in volume of the frozen fluid causes radial areas of deformation of the tubular portion 23, towards the inside thereof, which may substantially involve the entire portion or else only an intermediate or lower or upper stretch thereof, possibly involving also the valve seat 7 in the deformation. Such deformations may occasionally alter the sections of passage for the fluid or alter the area of sealing of the valve seat 7, or even cause points of failure of the tubular portion 23.

Figure 15:
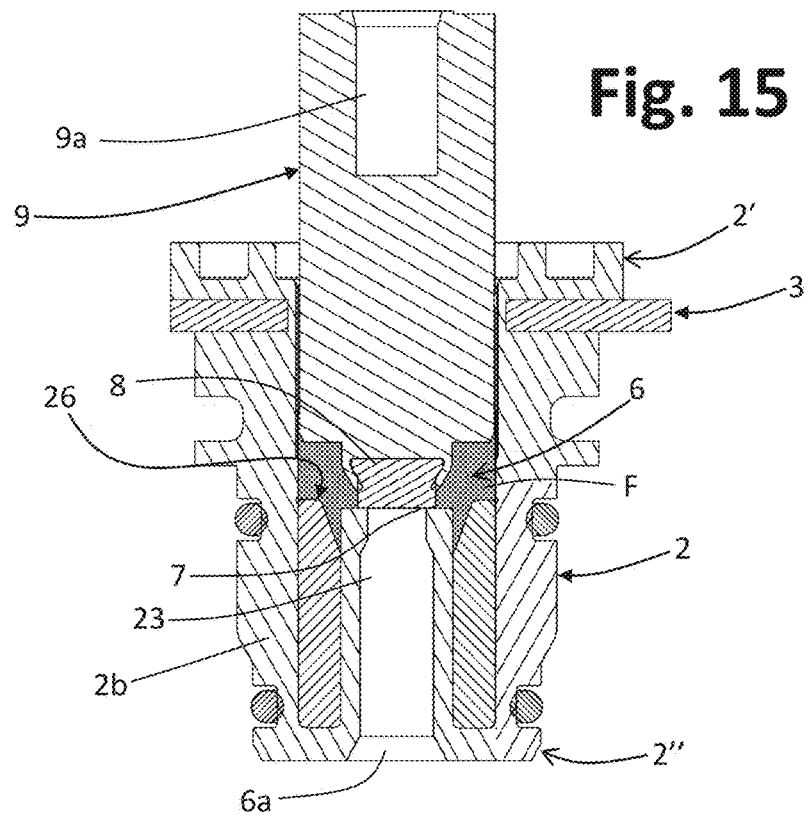
FIG. 15 is a schematic view similar to those of FIGS. 12-14 of a valve according to embodiments of the invention.

The presence of the compensation body 26, as illustrated in FIG. 15, enables to prevent such risks. The body 26 mounted around the tubular portion 23 enables a reduction in the volume that can be occupied by the residual liquid. In the case of freezing of the residual liquid F, its consequent increase in volume is compensated thanks to the capacity of compression of the body 26, in particular preventing stresses in a radial direction on the tubular portion 23.

As emerges clearly from the foregoing description, the valve forming the subject of the present invention achieves multiple advantages as compared to the solutions available in the prior art.

In the first place, the valve seat 7 is defined by a tubular portion 23 made of a single piece with the part made of moulded plastic material of the valve body 2. This solution prevents the need to use purposely dedicated additional components for assuming the function of valve seat, guaranteeing a valve provided with structural characteristics that are simpler and more precise than the solutions known in the art. On the other hand, since the tubular portion 23 has a small thickness, the risk of possible shrinkage of the moulded plastic material jeopardising the precision of the valve seat 7, and hence efficient co-operation between the means for shutting off the fluid and the valve seat, is reduced to a minimum. In addition to this, the compressible or deformable body 26 of the compensation element 25 is advantageously located within the chamber 6 for passage of the fluid, around the tubular portion 23, without any need to provide purposely dedicated housings, thus increasing the structural simplicity of the valve and its compactness. The valve forming the subject of the present invention is hence simple and inexpensive to produce.

The presence of the compensation element 25 that surrounds the tubular portion 23 prevents risks of deformation of the portion 23 and of the valve seat 7, preventing consequent risks of incorrect closing of the open/close member 8; there are likewise avoided risks of failure or restriction of the section of passage for the fluid.

It is clear that numerous variations may be made by the person skilled in the art to the valve described by way of example, without thereby departing from the scope of the invention as defined in the ensuing claims.

FIG. 16 illustrates a variant embodiment where a pin 9b is mounted centrally within the cavity 9a of the core 9, around which the spring 17 is located. In addition to performing functions of guiding the spring 17 in compression, the pin 9b enables reduction of the useful volume of the cavity 9a that can be filled by the fluid that might reach the area between the core 9 and the counter-core 18: the volume of this liquid is thus reduced, thereby enabling limitation of the negative effects that could be caused by an increase in volume thereof due to freezing. The pin 9b is preferably made of metal or some other stiff material; however, it could advantageously be made of an elastic and/or compressible material, for example a material similar to that of the element 25 so as to be able to undergo deformation and/or compression in the presence of freezing of the fluid.

The invention claimed is:

1. A valve for controlling a flow of a fluid, comprising:
   a valve body having at least one first valve body part made of a polymer or plastic material, the valve body having an inner surface;
   a chamber for passage of the fluid, defined within the first valve body part and comprising at least one fluid inlet and at least one fluid outlet, the chamber for passage of the fluid being delimited peripherally by a portion of the inner surface of the valve body;
   a valve seat defined within the chamber for passage of the fluid;
   shut-off means for shutting off the fluid, displaceable relative to the valve seat in order to control flow of the fluid; and
   a compensation element prearranged for compensating a possible increase in volume and/or pressure of the fluid, the compensation element comprising a compensation body made of an elastically deformable and/or compressible material, the compensation body having a body wall with a first surface and a second surface opposite to each other, the polymer or plastic material of the first valve body part being stiffer than the elastically deformable and/or compressible material of the compensation body,
   wherein the first valve body part comprises a tubular portion which extends between the valve seat and one of the fluid inlet or the fluid outlet, into the chamber for passage of the fluid, and wherein the compensation body is mounted within the chamber for passage of the fluid so as to surround at least partially the tubular portion,
   wherein said portion of the inner surface of the valve body is at a distance from an outer surface of the tubular portion, to delimit therebetween a hollow space of the chamber for passage of the fluid, the hollow space being in fluid communication with the other one of the fluid inlet or the fluid outlet,
   wherein the body wall of the compensation body is mounted into the chamber for passage of the fluid to occupy at least part of the hollow space, with said first surface of the body wall of the compensation body directly facing said portion of the inner surface of the valve body and with said second surface of the body wall of the compensation body directly facing said outer surface of the tubular portion, and wherein at least one side passageway is defined in the body wall of the compensation body, configured for connecting in fluid communication the valve seat and the other one of the fluid inlet or the fluid outlet.

2. The valve according to claim 1, wherein the tubular portion has an average thickness smaller than an average thickness of a peripheral wall of the first valve body part which defines said inner surface.

3. The valve according to claim 1, wherein the compensation body has a substantially axially-hollow cylindrical shape at least in an elastically undeformed and/or uncompressed condition thereof.

4. The valve according to claim 1, wherein:
the other one of the fluid inlet or the fluid outlet is arranged laterally with respect to the tubular portion; and
the body wall of the compensation body is a tubular wall in which the at least one side passageway is defined.

5. The valve according to claim 1, wherein at least one of the chamber for passage of the fluid or the compensation element comprises engagement means, prearranged for keeping the compensation body in a substantially predetermined axial position within the hollow space of the chamber for passage of the fluid.

6. The valve according to claim 5, wherein the engagement means comprise at least one rib or relief, which extends for at least one part of a circumference of the compensation body.

7. The valve according to claim 5, wherein the engagement means comprise at least one rib or relief, which extends for at least one part of a circumference of the compensation body, and a corresponding seat or recess defined in said portion of said inner surface of the at least one first valve body part, or vice versa.

8. The valve according to claim 1, wherein the shut-off means are displaceable relative to the valve seat at least between a closing position, where the fluid cannot pass from the fluid inlet to the fluid outlet, and an opening position, where the fluid can pass from the fluid inlet to the fluid outlet, in a direction that is generally parallel to a direction of longitudinal extension of the tubular portion and/or of the compensation element.

9. The valve according to claim 1, further comprising an actuation system configured for controlling displacement of the shut-off means.

10. The valve according to claim 9, wherein the actuation system comprises an electric actuator.

11. The valve according to claim 10, wherein the actuation system comprises a solenoid actuator.

12. A fluidic circuit or device, comprising a valve according to claim 1.

13. The valve according to claim 1, wherein, in an elastically undeformed and/or uncompressed condition of the compensation body, the first surface of the body wall of the compensation body has a profile which is at least in part complementary to a profile of said portion of the inner surface of the valve body, and/or the second surface of the body wall of the compensation body has a profile which is at least in part complementary to the outer surface of the tubular portion.

14. The valve according to claim 1, wherein the compensation body is mounted into the chamber for passage of the fluid such that a first longitudinal end of the body wall of the compensation body is located higher than the valve seat, and a second longitudinal end of the body wall of the compensation body is located lower than the other one of the fluid inlet or the fluid outlet.

15. The valve according to claim 14, wherein the at least one passageway comprises a recess that extends from one of the first or second longitudinal end of the body wall towards the other one of the first or second longitudinal end of the body wall.

16. The valve according to claim 1, wherein the at least one side passageway is a through-passageway of the body wall extending between the first surface and the second surface thereof.

17. A valve for controlling a flow of a fluid, comprising:
a valve body having at least one first body part made of a polymer or plastic material;
a chamber for passage of the fluid, defined within the first body part and comprising at least one fluid inlet and at least one fluid outlet;
a valve seat defined within the chamber for passage of the fluid;
shut-off means for shutting off the fluid, displaceable relative to the valve seat in order to control flow of the fluid; and
a compensation element prearranged for compensating a possible increase in volume and/or pressure of the fluid, the compensation element comprising a compensation body made of an elastically deformable and/or compressible material, the polymer or plastic material of the first body part being stiffer than the elastically deformable and/or compressible material of the compensation body,
wherein the first body part comprises a tubular portion which extends between the valve seat and one of the fluid inlet or the fluid outlet, into the chamber for passage of the fluid, and wherein the compensation body is mounted within the chamber for passage of the fluid so as to surround at least partially the tubular portion,
wherein defined within the chamber for passage of the fluid is one of a polarization element or a polarization counter-element, and the compensation body comprises the other one of the polarization element or the polarization counter-element, prearranged for keeping the compensation body in a substantially predetermined angular position within the chamber for passage of the fluid.

18. The valve according to claim 17, wherein
the other one of the fluid inlet or the fluid outlet is arranged laterally with respect to the tubular portion;
the compensation body defines at least one lateral passageway for enabling passage of the fluid between the valve seat and the other one of the fluid inlet or the fluid outlet; and
the at least one lateral passageway and the at least one polarization counter-element are defined in substantially opposite positions of a generally cylindrical wall of the compensation body.

19. The valve according to claim 18, wherein the at least one lateral passageway comprises a recess that extends starting from a first longitudinal end of a generally cylindrical wall of the compensation body, and the at least one polarization counter-element comprises a recess that extends starting from a second longitudinal end of the generally cylindrical wall, opposite to said first longitudinal end.

20. A compensation element for a valve that comprises at least one first valve body part having an inner surface which defines
a chamber for passage of a fluid,
at least one inlet and one outlet for the fluid in fluid communication with said chamber, and a valve seat within said chamber, the at least one first valve body part also defining a tubular portion which extends between the valve seat and one of the fluid inlet and the fluid outlet, a hollow space of said chamber being laterally delimited between said inner surface of the at least one first valve body part and an outer surface of the tubular portion, wherein the compensation element is designed to be mounted within said chamber and is prearranged for compensating a possible increase in volume and/or pressure of the fluid, the compensation element comprising a compensation body made of an elastically deformable and/or compressible material, the compensation body comprising:

a body wall pre-arranged for mounting within said hollow space, with an external surface of the body wall configured to directly face said inner surface of the at least one first valve body part, and with an internal surface of the body wall configured to directly face said outer surface of the tubular portion;

a lateral passageway in said body wall, configured for enabling passage of the fluid between said at least one inlet and one outlet, the lateral passageway comprising a recess that extends in an axial direction of the body wall of the compensation body, starting from a first longitudinal end of the body wall towards a second longitudinal end of the body wall;

at least one of an engagement element, prearranged for keeping the compensation body in a substantially predetermined position within said hollow space, or a polarization element, prearranged for keeping the compensation body in a substantially predetermined angular position within said hollow space.

* * * * *